US012638112B2

(12) United States Patent (10) Patent No.: US 12,638,112 B2
Almana et al. (45) Date of Patent: May 26, 2026

(54) INSULATION GASKET WITH RTJ SEAL FOR RTJ FLANGES IN HIGH-PRESSURE PIPING

(71) Applicants: SAUDI ARABIAN OIL COMPANY, Dhahran (SA); DELMON INDUSTRIAL AND MECHANICAL INSULATION FACTORY CO., Dammam (SA)

(72) Inventors: Mohammed S. Almana, Al Ahsa (SA); Tawfeeq S. Alsaqr, Al Ahsa (SA); Ali A. Alharbi, Dammam (SA); Usman Hanglur, Dammam (SA)

(73) Assignees: SAUDI ARABIAN OIL COMPANY, Dhahran (SA); DELMON INDUSTRIAL AND MECHANICAL INSULATION FACTORY CO., Dammam (SA)

( * ) Notice: Subject to any disclaimer, the term of this patent is extended or adjusted under 35 U.S.C. 154(b) by 25 days.

(21) Appl. No.: 18/617,313

(22) Filed: Mar. 26, 2024

(65) Prior Publication Data

US 2025/0305605 A1 Oct. 2, 2025

(51) Int. Cl.
*F16L 23/22* (2006.01)
*F16J 15/06* (2006.01)
*F16J 15/10* (2006.01)
*F16J 15/12* (2006.01)

(52) U.S. Cl.
CPC ............. *F16L 23/22* (2013.01); *F16J 15/064* (2013.01); *F16J 15/102* (2013.01); *F16J 15/121* (2013.01)

(58) Field of Classification Search
CPC ......... F16L 23/22; F16J 15/064; F16J 15/102; F16J 15/121
See application file for complete search history.

(56) References Cited

U.S. PATENT DOCUMENTS

| | | | | |
|---|---|---|---|---|
| 5,316,320 A | * | 5/1994 | Breaker | F16L 23/18 285/368 |
| 6,290,237 B1 | * | 9/2001 | Graupner | F16L 23/18 277/609 |
| 2018/0135754 A1 | * | 5/2018 | Veiga | F16J 15/065 |
| 2021/0003218 A1 | * | 1/2021 | Lee | F16J 15/122 |
| 2022/0373087 A1 | * | 11/2022 | Lee | F16J 15/104 |

* cited by examiner

*Primary Examiner* — James M Hewitt, II
(74) *Attorney, Agent, or Firm* — Osha Bergman Watanabe & Burton LLP

(57) ABSTRACT

A system and an apparatus for a new design for an insulation gasket with RTJ seal for RTJ flanges in high-pressure piping are disclosed. The system includes a first pipe and a second pipe, configured to be sealed together; and an apparatus, comprising: a ring type joint (RTJ) flange, and a insulation gasket with RTJ seal, wherein the insulation gasket with RTJ seal comprises a metal core, insulating sleeves, insulating washers, metallic back up washers, and a polytetrafluoro-ethylene ("PTFE") seal for RTJ grooves on either of its sides, configured to create a seal between the first pipe and the second pipe.

8 Claims, 3 Drawing Sheets

INSULATION GASKET WITH RTJ SEAL FOR RTJ FLANGES IN HIGH-PRESSURE PIPING

BACKGROUND

Designing effective flange connections has been one of the major challenges in the oil and gas industry; poor design/construction may be associated with failures that lead to oil spills or toxic gas leaks. Although there are many factors that may lead to failures, improper installation of the gasket may be a primary contributor. Given this background, there is need for an insulation gasket kit that is capable of isolating and creating a perfect seal between two dissimilar flanges, as well as being corrosion-resistant.

An insulation gasket kit includes an insulation gasket and ring-type joint ("RTJ") flange. The installation and functioning of a normal insulation gasket presents many problems, including alignment difficulty, incapability in high-pressure and high-torque environments, and high creep.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments disclosed herein relate to a system for a new design for an insulation gasket with RTJ seal that fits in RTJ grooves located on any type of RTJ flange in high-pressure piping. The system includes a first pipe and a second pipe, configured to be sealed together; and an apparatus, comprising: an RTJ flange, and a insulation gasket with RTJ seal, wherein the insulation gasket with RTJ seal comprises a metal core, insulating sleeves, insulating washers, metallic back up washers, and a polytetrafluoroethylene ("PTFE") seal for RTJ grooves on either of its sides, configured to create a seal between the first pipe and the second pipe.

In general, in one aspect, embodiments disclosed herein relate to an apparatus for a new design for an insulation gasket with RTJ seal for RTJ flanges in high-pressure piping. The apparatus includes an RTJ flange, configured to connect to a pipe; and a insulation gasket with RTJ seal, configured to connect to the RTJ flange, wherein the insulation gasket with RTJ seal comprises a metal core, insulating sleeves, insulating washers, and metallic back up washers, and a PTFE seal.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
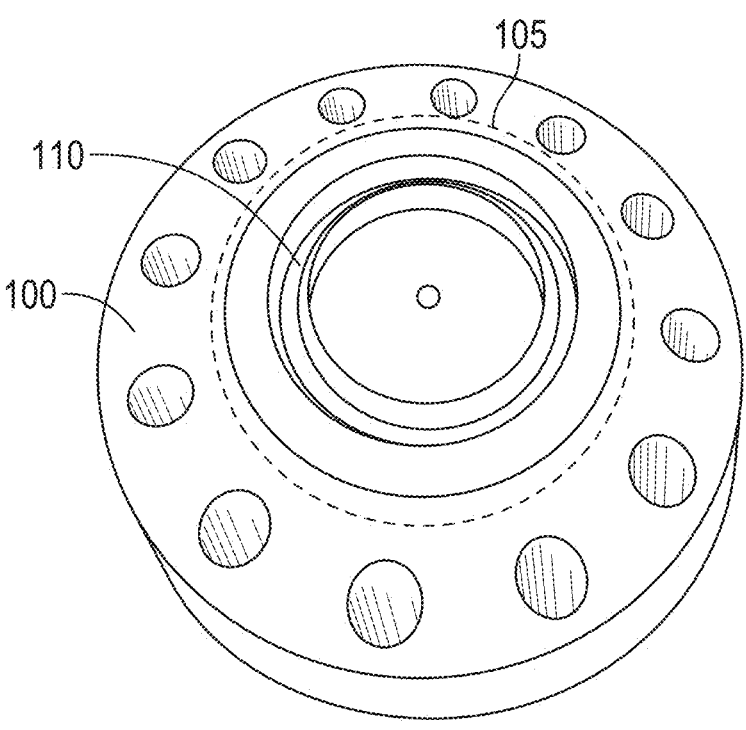
FIG. 1 shows an RTJ flange before insulation gasket installation, in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-6, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a gasket" includes reference to one or more of such gaskets.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

In this document, a system and apparatus are presented for an insulation gasket with an RTJ seal for an RTJ flange operating in a high-pressure piping environment. An RTJ connects to the end of a pipe and provides a means for joining two pipes together. An RTJ gasket may be a forged ring that fits into the machined groove of an RTJ flange. The ring-type joint gaskets may be either octagonal or oval in cross section. RTJ gaskets are generally used for high pressure and high-temperature applications, and are widely used in refinery, petrochemical, and oil field drilling industries. An axial compressive load (due to bolt tightening) acts on an insulation gasket causing it to deform and flow into irregularities of flange grooves. Due to this process, metal-on-metal contact may form between flanges on both sides of the gasket. RTJ gaskets are known to be tight compared to other gaskets, and have high tolerance to temperature and pressure changes.

The system described below includes the design for an insulation gasket that fits RTJ flanges called the "insulation gasket with RTJ seal." The insulation gasket with RTJ seal accommodates a polytetrafluoroethylene ("PTFE") seal inside the RTJ groove (for any type of RTJ flange) and extends toward the edge of the flange's inside diameter. (PTFE is a fluoropolymer commonly known by its trade name, Teflon®; its beneficial properties include nonreactivity, hydrophobicity, low coefficient of friction, and insulation.) The special design of the PTFE seal may provide high strength, resistance against high torquing, the ability to withstand high pressures, and an installation without alignment difficulties for Cathodic Protection (CP) electrical sealing system and dissimilar material. This prevents metal-on-metal contact between flanges on either side of the insulation gasket with RTJ seal.

RTJ flanges are designed to withstand high pressure lines. However, conventional insulation gaskets are typically only available in the form of flat gaskets with a steel core. As such, they do not perform well due for several reasons. First, the spring energized PTFE seals may not be aligned properly during installation. The PTFE seal may then slip into the RTJ flange grooves while tightening. Second, the sealing area available in many RTJ flanges may be narrow and unable to accommodate PTFE seals. Third, the placement of PTFE seals within a narrow sealing space at the edge of conventional insulation gaskets may cause damage to the glass reinforced epoxy ("GRE") insulation coating during the application of high torquing. This may cause leaking in the future. And, fourth, because the conventional insulation gasket is flat, it is difficult to align while tightening the seal and may damage the PTFE The following system may provide a permanent solution for RTJ flanges of any type. The proposed components include a GRE NEMA G10/G11 gasket with a metal core, a high strength PTFE seal for RTJ grooves on either of its sides, insulating sleeves, insulating washers, and metallic back up washers.

FIG. 1 shows an RTJ flange (100) before it has been insulated with an RTJ gasket. The RTJ flange (100) includes a metal ring which becomes compressed when the connecting bolts of the flange are tightened to a pipe or other connection, thus resulting in a leak-proof seal. The RTJ groove (110) is the concentric indented shape near the interior diameter of the RTJ flange (100). The "face" (105) of the RTJ flange (100) is the part of the RTJ flange (100) upon which a gasket sits.

Figure 2:
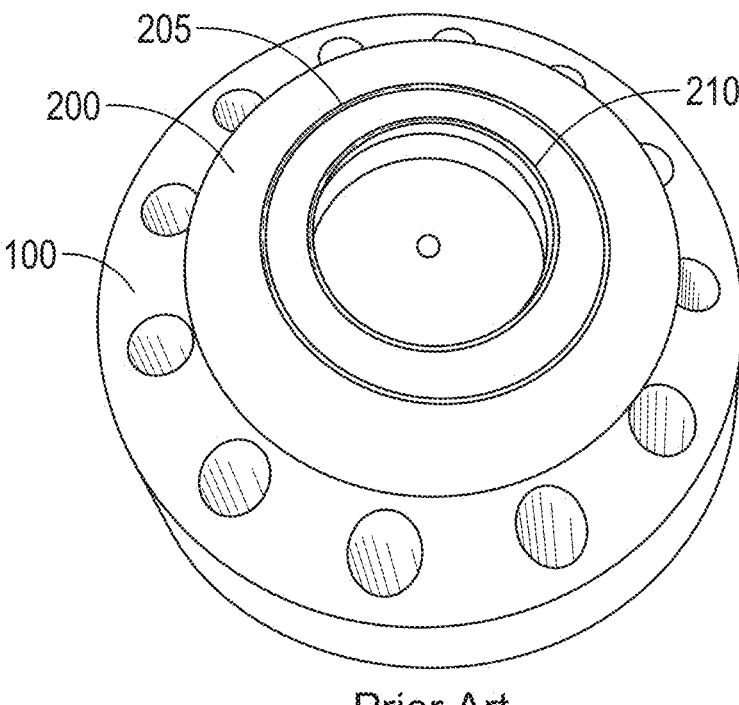
FIG. 2 show an RTJ flange with conventional insulation gasket placed for installation, in accordance with one or more embodiments.

FIG. 2 shows the RTJ flange (100) with a conventional RTJ gasket (200) mounted on top of it. The conventional RTJ gasket (200) is designed to sit between two RTJ flanges (100) and create the leak-proof seal. The shape of the conventional RTJ gasket (200) in FIG. 2 has a first thin concentric ring (205) and a second thin concentric ring (210) that align with grooves on a flange. The first thin concentric ring (205) and the second thin concentric ring (210) of the conventional RTJ gasket (200) rest on the face (105) and not within the RTJ groove (110) of the RTJ flange (100). The new design allows for the gasket allows it to fit into the RTJ groove (110) of the RTJ flange (100).

Figure 3:
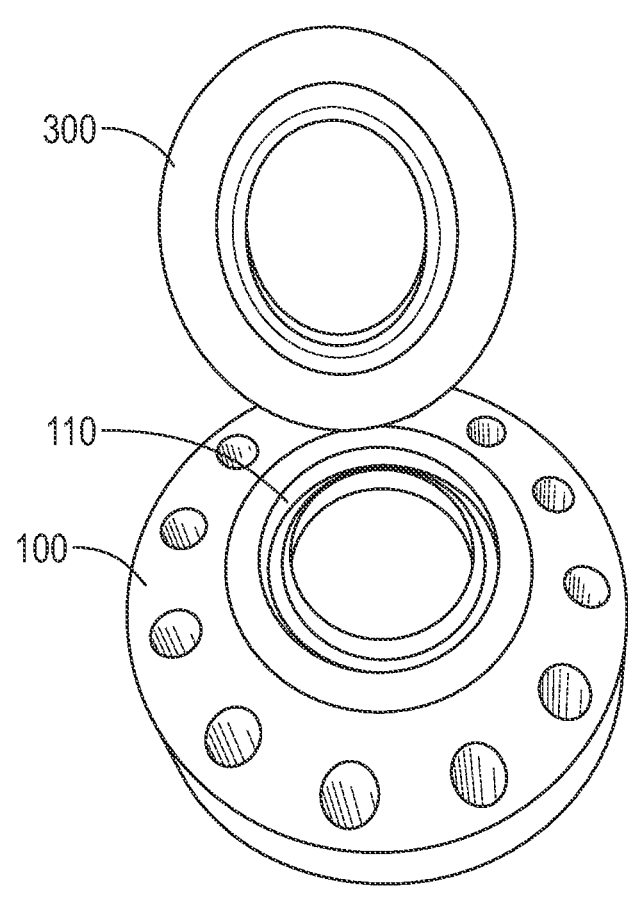
FIG. 3 shows an insulation gasket with RTJ seal side view with RTJ flange facing, in accordance with one or more embodiments.

FIG. 3 shows the insulation gasket with RTJ seal (300) and the RTJ flange (100) separately. This design prevents metal-on-metal contact between flanges on either side of the gasket. The RTJ groove (110) is the concentric indented shape near the interior diameter of the RTJ flange (100).

Figure 4:
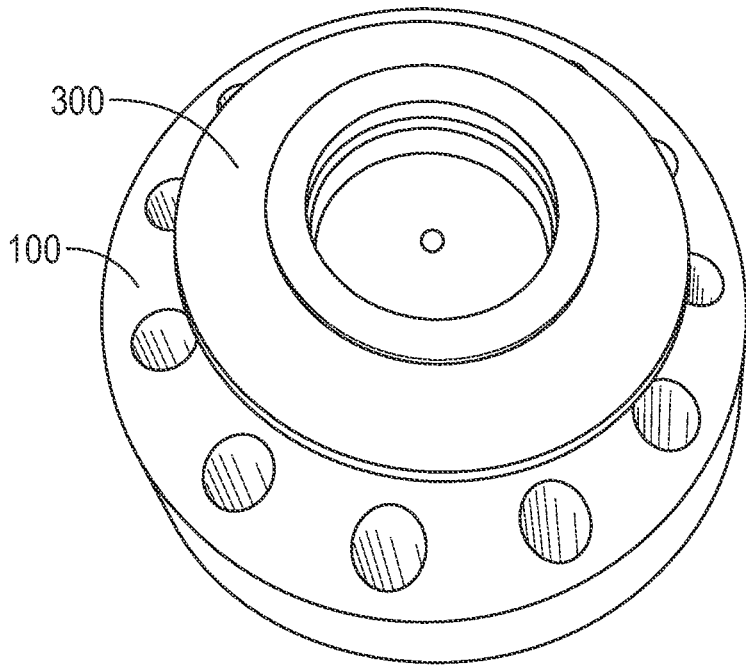
FIG. 4 shows an RTJ flange with insulation gasket with RTJ seal, in accordance with one or more embodiments.

FIG. 4 shows the insulation gasket with RTJ seal (300) after installation on the RTJ flange (100). The insulation gasket with RTJ seal (300) includes the PTFE seal inside the RTJ groove (110) and extends toward the edge of the flange's inside diameter.

Figure 5:
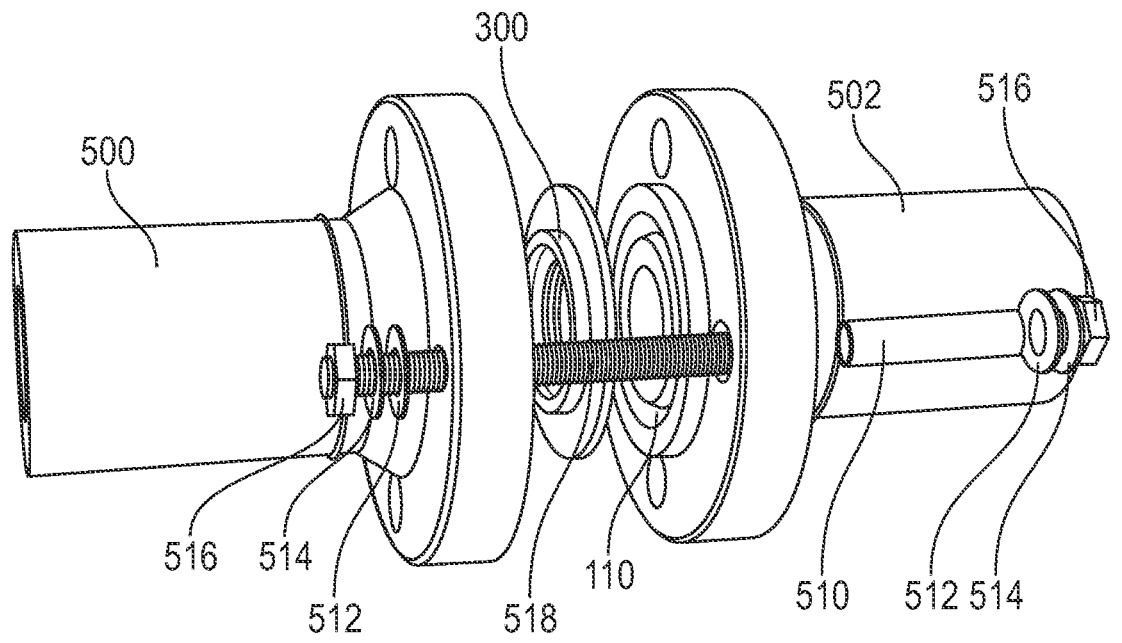
FIG. 5 shows the connection of two pipes, each with a flange, along with a gasket, in accordance with one or more embodiments.

FIG. 5 shows the insulation gasket with RTJ seal (300) fit-up when a first pipe (500) and a second pipe (502) are sealed together by the insulation gasket with RTJ seal (300). The pipes are connected using insulating sleeves (510), insulating washers (512), metallic back up washers (514), hex nuts (516), and connecting bolts (518).

Figure 6:
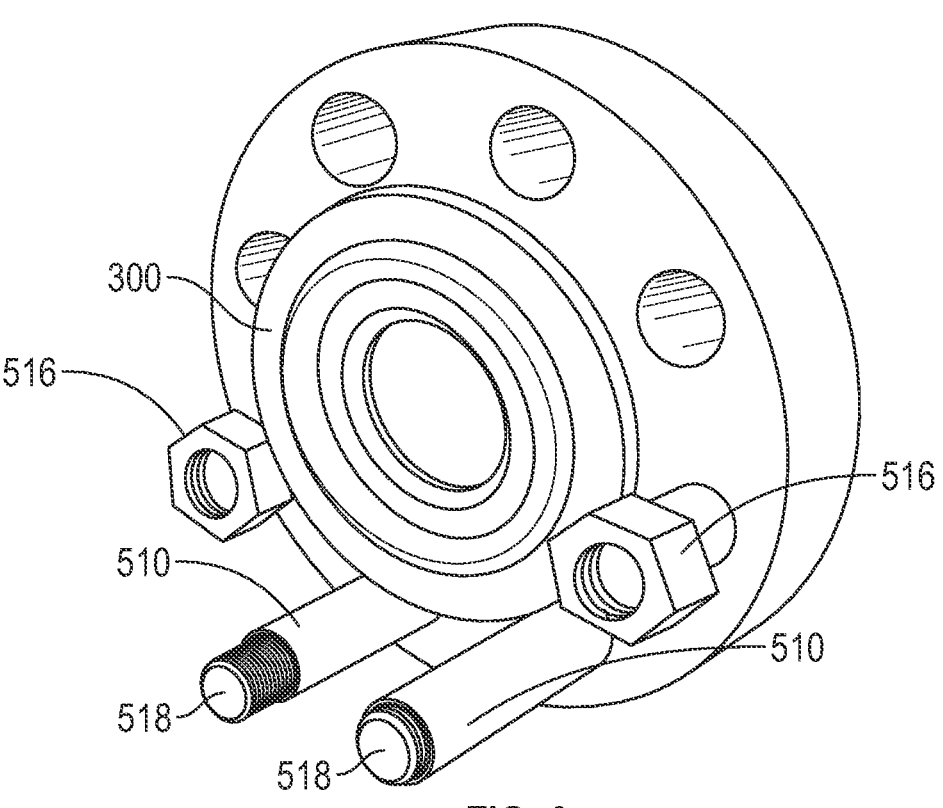
FIG. 6 shows the insulation gasket with RTJ seal connected to a flange, isolated from the pipes for which it forms the seal, in accordance with one or more embodiments.

FIG. 6 shows the insulation gasket with RTJ seal (300) fit up on the RTJ flange. Insulating sleeves (510), hex nuts (516), and connecting bolts (518) are also shown.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. An apparatus, comprising:
   a ring type joint (RTJ) flange, configured to connect to a pipe; and
   an insulation gasket with RTJ seal, configured to connect to the RTJ flange, wherein the insulation gasket with RTJ seal comprises a metal core, insulating sleeves, insulating washers, metallic back up washers, and a polytetrafluoroethylene (PTFE) seal;
   wherein the insulation gasket with RTJ seal accommodates the PTFE seal inside a groove of the RTJ flange, and
   wherein the PTFE seal extends to an edge of a diameter of the RTJ flange to prevent a metal on metal contact between the RTJ flange and a metal core of the insulation gasket with RTJ seal.

2. The apparatus of claim 1, wherein the insulation gasket with RTJ seal is oval or octagonal in a cross section.

3. The apparatus of claim 1, wherein the insulation gasket with RTJ seal is a GRE NEMA G10/G11 gasket.

4. The apparatus of claim 1, wherein the insulation gasket with RTJ seal provides a cathodic protection electrical sealing.

5

6

5. A system, comprising:

a first pipe and a second pipe, configured to be sealed together; and an apparatus, comprising:

a ring type joint (RTJ) flange, and an insulation gasket with RTJ seal, the insulation gasket with RTJ seal comprising a metal core, insulating sleeves, insulating washers, metallic back up washers, and a polytetrafluoroethylene ("PTFE") seal for RTJ grooves on either side of the insulation gasket with RTJ seal, configured to create a seal between the first pipe and the second pipe, wherein the insulation gasket with RTJ seal accommodates the PTFE seal inside a groove of the RTJ flange, and wherein the PTFE seal extends to an edge of a diameter of the RTJ flange to prevent a metal on metal contact between the RTJ flange and a metal core of the insulation gasket with RTJ seal gasket.

6. The system of claim 5, wherein the insulation gasket with RTJ seal is oval or octagonal in a cross section.

7. The system of claim 5, wherein the insulation gasket with RTJ seal is a GRE NEMA G10/G11 gasket.

8. The system of claim 5, wherein the insulation gasket with RTJ seal provides a cathodic protection electrical sealing.

\* \* \* \* \*